United States Patent
Florent et al.

(10) Patent No.: US 6,571,004 B1
(45) Date of Patent: May 27, 2003

(54) IMAGE PROCESSING METHOD AND X-RAY APPARATUS HAVING IMAGE PROCESSING MEANS FOR EXTRACTING A THREAD-LIKE STRUCTURE IN A NOISY DIGITAL IMAGE

(75) Inventors: Raoul Florent, Valenton (FR); Jacques Breitenstein, Le Plessis-Trevise (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/474,304

(22) Filed: Dec. 29, 1999

(30) Foreign Application Priority Data

Dec. 29, 1998 (EP) .............................................. 98403323

(51) Int. Cl.[7] .................................................. G06K 9/00
(52) U.S. Cl. ....................................... 382/128; 382/132
(58) Field of Search ................................ 382/219, 128, 382/132, 257, 258, 259, 274

(56) References Cited

U.S. PATENT DOCUMENTS 5,274,551 A * 12/1993 Corby, Jr. .................... 600/433
5,289,373 A    2/1994 Zarge et al. ............ 364/413.13
5,644,612 A * 7/1997 Moorman et al. ......... 378/98.2

* cited by examiner

Primary Examiner—Leo Boudreau
Assistant Examiner—Tom Y. Lu
(74) Attorney, Agent, or Firm—John Vodopia

(57) ABSTRACT

An image processing method and an X-ray apparatus in which a thread-like structure represented on the background in a noisy digital original image is extracted. Original image data is acquired and reduced using a transformation operation so as to provide a reduced image. The most probable locations of guide-wire points in the reduced image are selected by selecting at each point the direction of the guide-wire which provides the best match with one of several predetermined regularly oriented directions and by probing the contrast around and in the selected directions and then probing the contrast around selected locations in the original image corresponding to the selected location of points in the reduced image. Then, the points which satisfy a contrast condition are extracted and the points which also satisfy a connectivity criterion in the reduced image are connected and these points are extracted as guide-wire points of the original image.

17 Claims, 5 Drawing Sheets

IMAGE PROCESSING METHOD AND X-RAY APPARATUS HAVING IMAGE PROCESSING MEANS FOR EXTRACTING A THREAD-LIKE STRUCTURE IN A NOISY DIGITAL IMAGE

FIELD OF THE INVENTION

The invention relates to an image processing method for extracting a thread-like structure represented on a background in a noisy digital image. The invention relates in particular to an image processing method for extracting the points representing a catheter guide-wire in an X-ray fluoroscopy medical image. The invention also relates to an X-ray apparatus having means for image processing.

The invention is applied in the manufacture of X-ray apparatus.

BACKGROUND OF THE INVENTION

An image processing method for extracting a catheter guide-wire is already known from U.S. Pat. No. 5,289,373 (Zarge et al.). This patent relates to a method and an apparatus for the real-time tracking of a catheter guide-wire in fluoroscopy images during interventional radiological procedures. Such a method includes three main steps:

- a pixel-wise extraction step for determining whether or not each pixel should be labeled as a possible guide-wire point so as to form an image called binary peak image,
- a chain model construction step followed by an identification of a guide-wire model as the most promising path among previously determined chains, and
- a step for the superimposition of the guide-wire model onto the live fluoroscopic images.

The first step is an iconic process that thoroughly exploits the outputs of several first and second order linear operators. The second step is non-iconic. It relates to morphological operations and to chain and tree oriented methods.

OBJECTS AND SUMMARY OF THE INVENTION

It is an object of the present invention to provide a method which can be carried out in real time, with a substantial gain in speed with respect to the prior art method described above, together with a higher sensitivity and selectivity, while using processing means with a speed of the kind presently used in the state of the art.

This aim is realized by a processing method for extracting a thread-like structure represented on the background in a noisy digital image, i.e., an original image, in which original image data is acquired and reduced using a transformation operation so as to provide a reduced image. The reduced image is processed by selecting the most probable locations of guide-wire points by selecting, at each point, the direction of the guide-wire which best matches one of several predetermined regularly oriented directions and by probing the contrast around and along in the selected directions. Then, reverting back to the original image, the contrast around the selected locations previously determined in the reduced image is probed and the point(s) which satisfy a contrast condition in the original image is/are extracted. The points which also satisfy a connectivity criterion in the reduced image are connected and extracted in the original image as guide-wire points of the original image.

An X-ray apparatus with means for carrying out the above processing methods in accordance with the invention also includes a display including a screen for displaying the medical digital images and the processed medical digital images.

BRIEF DESCRIPTION OF THE DRAWINGS

The invention will be described in detail hereafter with reference to the diagrammatic figures; therein.

DETAILED DESCRIPTION OF THE INVENTION

The invention relates to an image processing method for extracting a thread-like structure represented on a background in a noisy digital image. The invention relates in particular to an image processing method for extracting the points representing a catheter guide-wire in an X-ray fluoroscopy medical image. The invention also relates to an X-ray apparatus having means for image processing. The medical image may be an image representing blood vessels called an arteriogram image.

In the field of cardiology, sequences of X-ray arteriogram images are used to visualize in real time medical procedures for introducing a catheter in a vessel. Such medical procedures using a catheter rely to a great extent on the correct visibility of the guide-wire which is a metallic wire introduced in the vessel for guiding the catheter.

An on-line image processing operation for extracting this guide-wire in an arteriogram image, that is the detection and location of the points belonging to the guide-wire, can serve several highly interesting purposes.

For example, an extraction mask may be constructed via the extraction operation and can be used with a noise filter in order to reduce the quantum noise of the image while maintaining the original contrast of the guide-wire. This contrast can be enhanced thus increasing visibility, in order to facilitate a surgical intervention by the practitioner. After complete extraction of the guide-wire, the guide-wire tip can be located and an area of interest can be defined around this tip. This enables further local processing for visibility enhancement of a so-called stent tool which is introduced into the vessel for its enlargement. In multi-plane systems, the correct extraction of the guide-wire in several planes can offer a 3-D reconstruction of the guide-wire, offering a new visualization means to correctly guide the guide-wire within the vessel.

Figure 1:
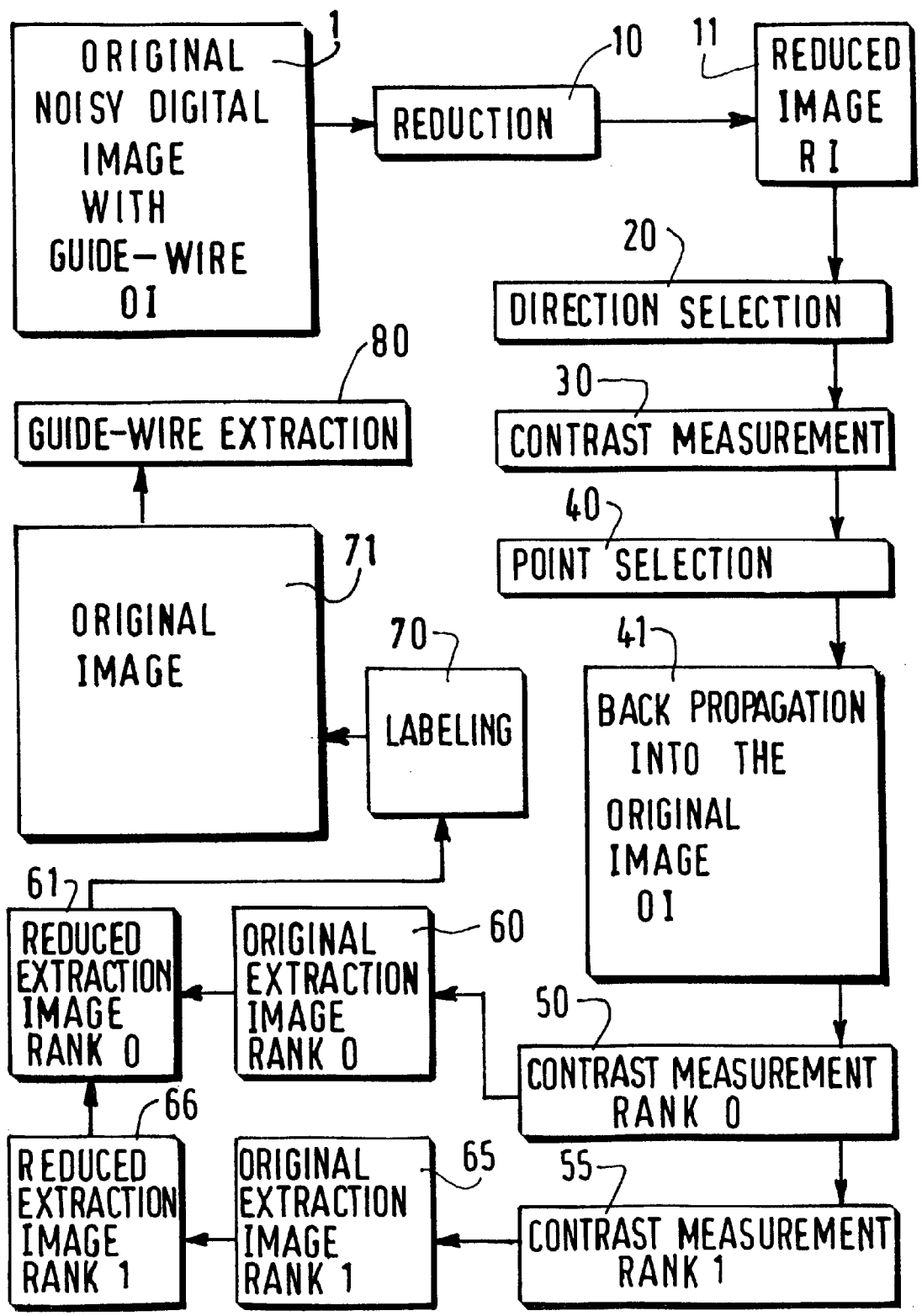
FIG. 1 is a functional block diagram illustrating the main steps of the method in accordance with the invention.

FIG. 1 shows diagrammatically the steps of a processing method in accordance with the invention for extracting a thread-like structure represented on the background of a noisy digital image called the original image. In an example described hereafter, the thread-like structure is a guide-wire represented on the background of a medical fluoroscopy arteriogram. A fluoroscopy arteriogram is a digital image formed with a low level X-ray. Consequently, this fluoroscopy digital image will be noisy. In the present example, the process seeks to extract the guide-wire in order to improve the medical image. Such an improved image may be used during a radiology-assisted surgical procedure. The following process is completely described on the basis of its acting on one image only. So, the different steps of this process are applied to one reference image called the original image. The following process also functions in real time, that is at a frame rate of about 25 images per second.

Referring to FIG. 1, in order to reduce the computational requirements without impeding the results, and to improve the detection of the guide-wire, the input data relating to the original image, denoted OI is first acquired in step 1 and then reduced by an appropriate reduction transform 10. Then, a preliminary extraction of the guide-wire is carried out on the resultant image which is called the reduced image and denoted RI. This first extraction is performed by steps 20, 30, 40 and limits the regions in which guide-wire points are to be looked for in the original image OI.

Figure 2:
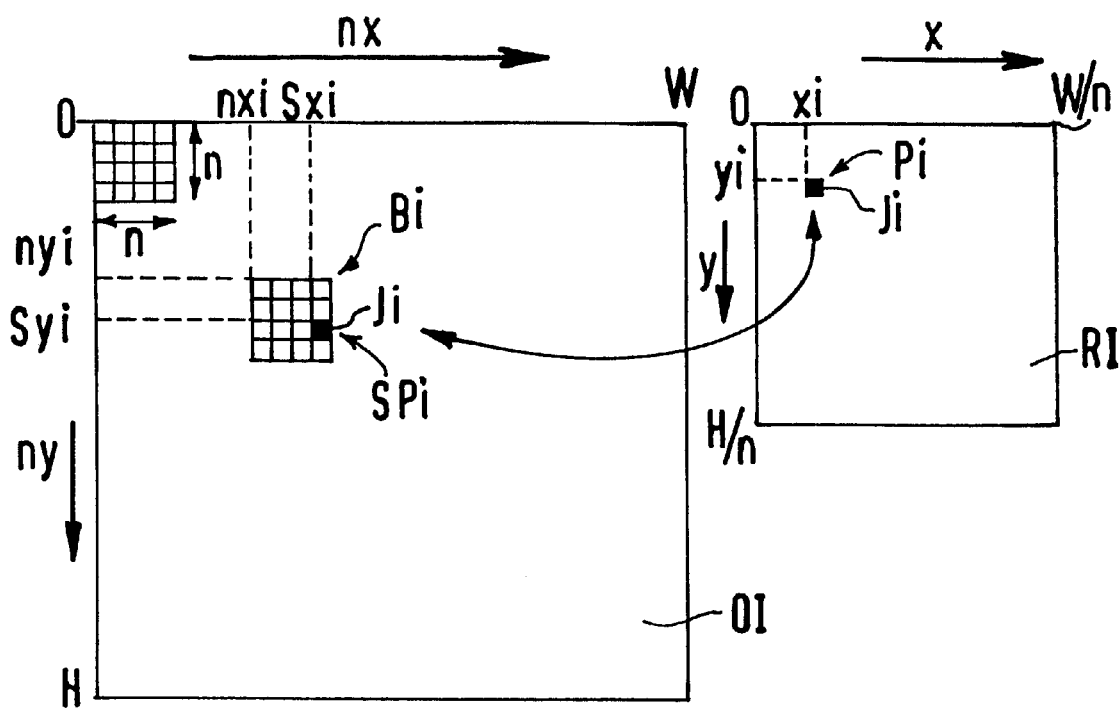
FIG. 2 illustrates the image reduction step in a method in accordance with the invention.

Referring to FIG. 2, the reduction step 10 is carried out while using a reduction transform operation which comprises a morphological erosion operation with a flat kernel of size n×n, followed by a corresponding sub-sampling operation of 1 point every n points of the original image in two orthogonal directions such as columns and rows of the original image OI according to the axes nx and ny, respectively. The reduction transform amounts to paving the original image OI with non-overlapping contiguous blocks B of n×n points. Assuming that the original image OI has a dimension W along the nx axis and H along the ny axis, reduction by a factor n yields the corresponding dimensions W/n, H/n of the reduced image RI. In the reduced image RI, the corresponding axes are called x and y.

One block Bi of coordinates nxi, nyi of the original image OI corresponds to a point Pi of coordinates xi, yi in the reduced image RI. For the point Pi in the reduced image RI, the intensity value Ji is determined as the intensity of one point of the block Bi in the original image OI, denoted Spi, which has the minimum intensity value Ji from among the points in the block Bi. The point SPi of the block Bi is called the source-point and has the coordinates Sxi, Syi. The respective coordinates Sx, Sy of all source-points SP are called source-coordinates and may be stored in 1-D tables, together with the data of the reduced image RI. The reduction transform associates with each point of the reduced image RI one counterpart point in the original image OI. Referring to FIG. 1 again, the reduced image RI is stored in 11.

This morphological erosion 10 constitutes a non-linear image reduction which presents several advantages. It completely preserves the guide-wire overall shape (except its width) and produces a 1 to 1 association from the transform points to their sources in the original image. For example, practical tests have demonstrated the relevance of this morphological operation for a reduction factor n less than to or equal to 8, applied to an original image resolution of 512×512. In a fluoroscopy arteriogram, the guide-wire, being a metallic tool, has a high absorption factor and does not vary in the erosion process 10. The guide-wire is substantially preserved after erosion and sub-sampling. Another beneficial aspect of the non-linear image reduction 10 is its ability to make the guide-wire, being an elongate mono-dimensional structure, thinner in the reduced image than in the original image, this in turn makes its extraction easier. It is a reason why this first step 10 enhances the detection of the guide-wire.

Figure 3A:
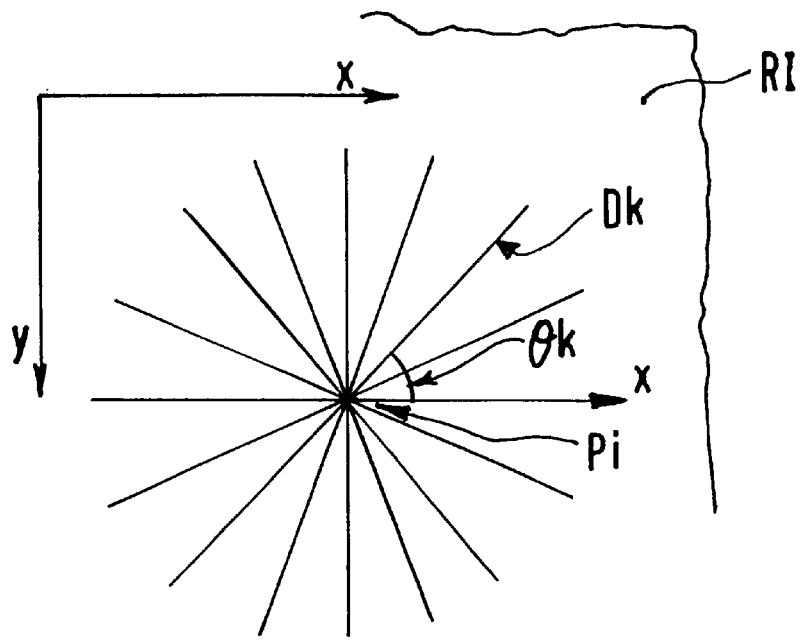
FIGS. 3A and 3B illustrate the direction selection step in a method in accordance with the invention.

Referring to FIG. 1, each point considered in the reduced image RI, represented in block 11, is a priori considered as a potential guide-wire point. The process also includes a direction selection step 20 for determining a most probable guide-wire direction at that point. Referring to FIG. 3A, for this purpose, a predetermined number of regularly oriented directions denoted Dk, is chosen for the entire image. The step 20 includes a tangential direction selection operation which associates one of the predetermined directions Dk with each point as the best match according to a given selection criterion. The Dk directions are measured by angles $\theta k$ with respect to a reference axis, where k is the number of Dk directions. The reference axis may be the axis X parallel to x.

A selection criterion is designed and applied to each point. The criterion expresses the fact that a point Pi is a guide-wire point whenever the point is crossed by a dark fine segment whose angle with respect to the different Dk directions is considered. There may be several Dk candidates. One Dk direction is selected from among the candidates when the average gray-level in both orientations of the Dk direction is minimum, that is to say along the orientation $\theta k$, corresponding to the first orientation of the Dk direction, and along the second orientation $\theta k+\pi$. The corresponding orientation axis Dk of angles $\theta k$, $\theta k+\pi$ crosses the candidate guide-wire point Pi.

Referring to FIG. 3A, 8 directions, such as k=8, have been chosen. This number proved to be a good compromise providing both a good resolution and a good calculation efficiency. This choice of the number k, however, is not restrictive.

Figure 3B:
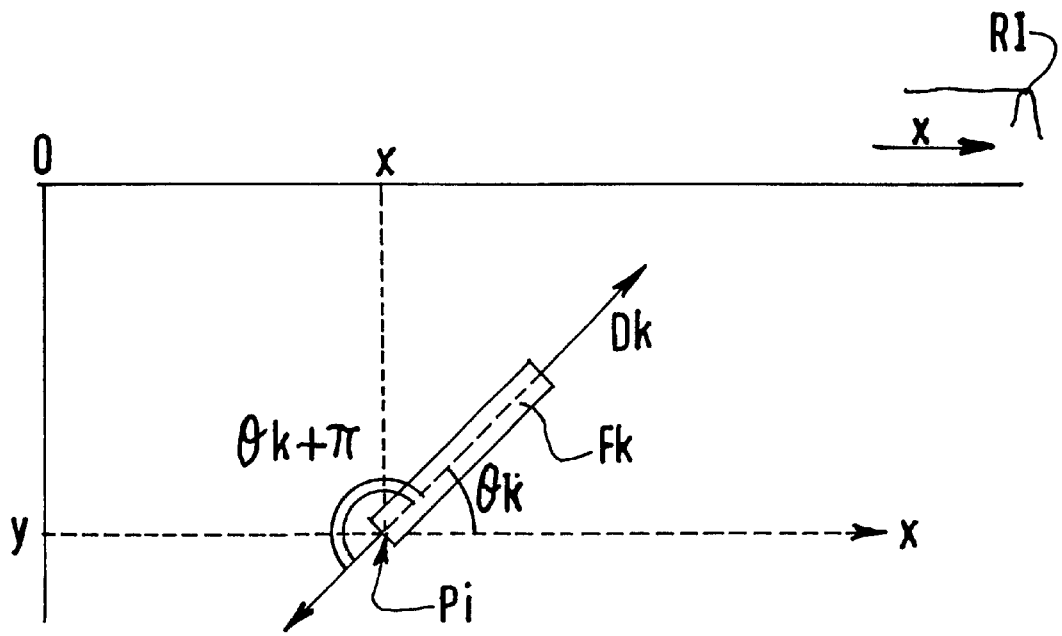

Referring to FIG. 3B, in order to carry out step 20 for direction selection, local averages are calculated through the use of 1-D filters Fk having oriented kernels in these directions Dk so as to select the minimum gray-level as required.

For this purpose, the reduced image RI is scanned by way of a standard procedure which is known to those skilled in the art, for example parallel to the X axis, point after point, from the upper left corner of the reduced image RI to the lower right corner. At each current point Pi, a first direction Dk is processed. In the first direction Dk, a first gray-level average is formed over a few points, for instance 3 to 6 points, in the orientation $\theta k$. Then, a second gray-level average is formed over the same number of points in the orientation $\theta k+\pi$. Then, the maximum gray-level value of the first and second gray-level averages is determined and retained in relation to the first processed direction Dk. All the other directions of the k directions Dk are processed in the same way so as to determine a set of a number k of maximum gray-level values which are retained in relation to each of the directions Dk.

Then, a minimum gray-level value is determined and retained from among the set of k maximum gray-level values. The minimum gray-level value is related to a corresponding Dk direction having an orientation $\theta k$ or $\theta k+\pi$ which is then selected as the most probable direction Dk of a guide-wire crossing the current point Pi in the reduced image RI. The reduced image RI is scanned point after point by way of the standard scanning procedure and one selected direction is retained for each current point.

Referring to FIG. 1, once a direction has been estimated at each current point of the reduced image RI, a step 30 for local contrast measurement is performed in the reduced image. For this purpose, the reduced image RI is scanned again by way of the standard scanning procedure.

Figure 4A:
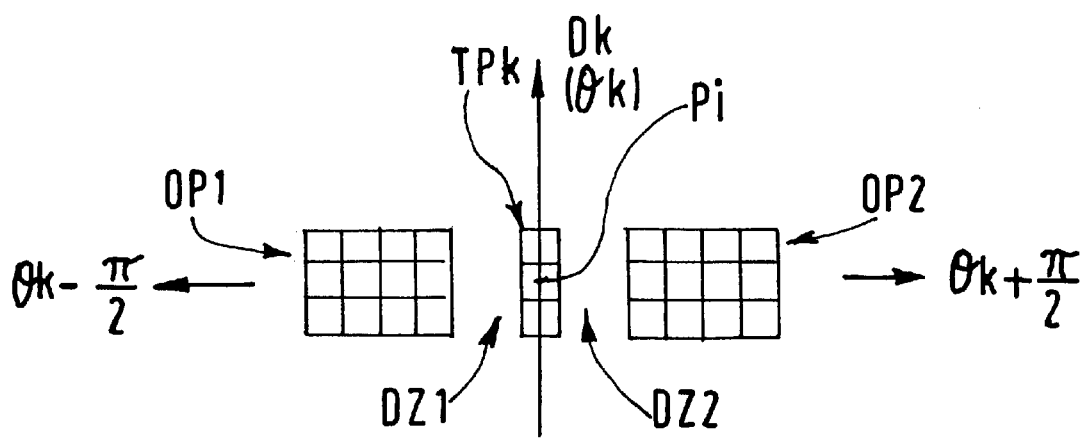
FIGS. 4A and 4B illustrate the reduced image contrast measurement step in a method in accordance with the invention.
Figure 4B:
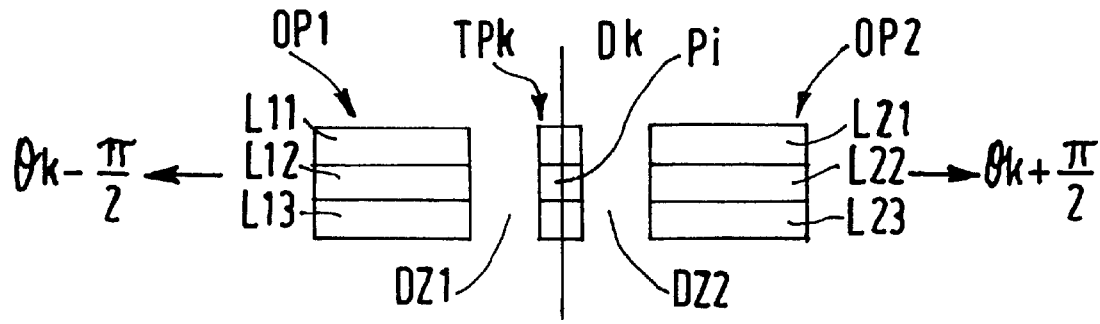

Referring to FIGS. 4A and 4B, at each current point Pi associated with its selected direction Dk there is calculated a difference of gray-levels measuring the contrast between the potential guide-wire segment and its neighborhood. This calculation is performed by evaluating the difference between a first term, integrating the local gray-levels around the selected direction Dk, that is in the orthogonal directions of orientations θk−π/2 and θk+π/2, and a second term which estimates the gray-levels of points in the selected direction Dk of orientation θk and θk+π. The first term is called orthogonal measurement and the second term is called tangential measurement. When evaluated at an actual guide-wire point, the orthogonal measurement is greater than the tangential measurement.

The tangential measurement at θk and θk+π may be the average value or preferably the median value, denoted R, of the gray-levels of points belonging to a short segment, denoted TPk, of a predetermined number of points oriented in the selected direction Dk. The current point Pi is disposed at the center of the segment TPk. The orthogonal measurement uses a set of local gray-level averages around the selected Dk direction, that is to either side of the assumed guide-wire points TPk. This measurement excludes the central points, i.e., the points of the segment TPk. This defines two dead zones DZ1, DZ2 and two neighborhoods OP1, OP2, respectively, to each side of the segment TPk. Each neighborhood is divided into lines of points. For example, the segment TPk has 3 points and the first and second neighborhoods are divided into 3 lines, each L11, L12, L13 and L21, L22, L23, respectively, which are orthogonal to the segment TPk. The lines are aligned on the respective points of the segment TPk. The local gray-level averages of the orthogonal measurement may be determined according to one of the following feasible sub-steps.

A first possible sub-step consists in evaluating one average of the gray-level values on each line L11, L12, L13 of the first neighborhood OP1 and on each line L21, L22, L23 of the second neighborhood OP2, thus determining a first set of 3 averages and a second set of 3 averages, i.e., 6 averages. This substep subsequently consists in evaluating a first minimum gray-level value from the first set of averages and a second minimum gray-level value from the second set of averages, followed by an evaluation of the minimum gray-level value denoted R6, from the first and second minimum gray-level values, i.e., taking the minimum gray-level value of the averages.

A second possible sub-step consists in evaluating a first, a second and a third gray-level average, respectively, on all points of the first lines L11, L21, on all points of the second lines L12, L22, and on all points of the third lines L13, L23 of the two neighborhoods OP1, OP2, followed by the evaluation of the minimum gray-level value, denoted R3, of these first, second and third averages. In this contrast measurement step 30, the use of R3, resulting from a more permissive calculation than R6, is preferred in particularly noisy conditions. The contrast measurement 30 is provided either by the difference R1 or R0:

$$R0 = R6 - R$$

$$R1 = R3 - R$$

Referring back to FIG. 1, after the contrast measurement 30, a point selection operation 40 is performed in the reduced image RI. For this purpose, the contrast measurement 30 is directly used to select guide-wire point candidates in the reduced image RI in the step 40. This may be achieved through the use of a threshold. In order to perform the threshold operation, the points of the reduced image where a positive contrast has been found may be selected. A threshold value that is automatically tuned to select a predetermined number of point candidates may also be used. It is advantageous that in the reduced image RI, the local averages are calculated while using 1-D filters which perform direct computations of cumulated gray-level summations on entire straight digital lines oriented according to the different Dk directions and covering the entire reduced image RI. In order to perform such 1-D filtering, the entire reduced image RI is submitted to a preliminary regular scanning procedure which is different from a standard procedure as known to those skilled in the art in that the preliminary procedure is performed in all predetermined directions Dk instead of, for example, along only one axis X. On each straight scanning line, the cumulated summations of gray-levels are calculated from a first point at one extremity of the scanned line to a last point at the other extremity of the scanned line. These cumulated sums are calculated only once and are used for the evaluation of all averages which are necessary in the steps 20 for direction selection and the step 30 for contrast measurement in the reduced image RI.

Once the cumulated summations are stored, the reduced image RI is scanned according to the standard.procedure known to those skilled in the art, for example parallel to the X axis, and for each current point of the reduced image RI, the local average at a given number of points, in a direction Dk, is then obtained by forming an appropriate difference from cumulated sums calculated in that direction.

Since the morphology-based transform 10 producing the reduced image also defines a 1-to-1 mapping from the pixels of the reduced image to their sources in the original image, the selection process 40 in the reduced image RI also straight forwardly induces a selection process in the original image OI. So the same directions are used in the original image as in the reduced image. In step 41, the selected points in the reduced image are thus propagated to the original image OI together with their selected orientations. These selected points and the neighborhoods defined around the points in the original image may be used to validate or invalidate the first selected candidates in the reduced image RI. Tests have proved that the direction selection applied in the reduced image was appropriately reliable.

Referring to FIG. 1, the process also includes at least one step 50 for contrast measurement in the original image OI. This step 50 is carried out in the original image OI in a way similar to the step 30 for contrast measurement in the reduced image RI. As opposed to the difference with the step 30 performed in the reduced image RI, the 1-D filters used to calculate averages in the original image OI do not use cumulated sums. Instead, they perform calculations on discrete points. Large numbers of calculations are no longer required for the original image OI since the points of interest have already been selected in the reduced image RI and propagated to the original image OI. The original image OI is scanned while using a standard procedure known to those skilled in the art, for instance point after point on digital straight lines parallel to the nx axis which is parallel to the X axis, from the upper left corner to the lower right corner of the original image. Contrast measurements are performed each time a source-point SPi corresponding to a selected point Pi of the reduced image is encountered.

Figure 5:
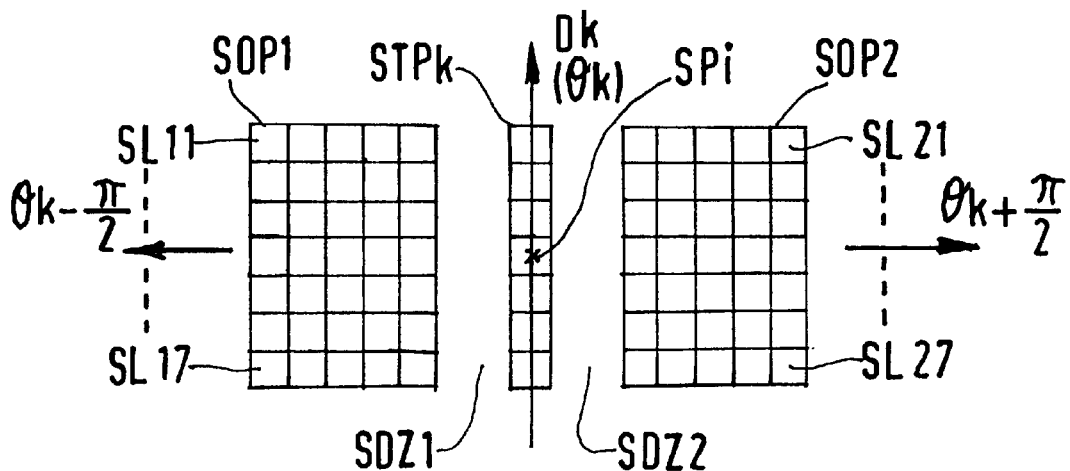
FIG. 5 illustrates the original image contrast measurement step in a method in accordance with the invention.

Referring to FIG. 5, a difference of gray-level values, measuring the contrast between the potential guide-wire segment and its neighborhoods, is calculated. This calculation is performed by again evaluating a difference between a first term of orthogonal measurement and a second term of tangential measurement. However, a major difference consists in that this contrast measurement in the original image OI is less permissive than the step 30 in the reduced image RI. The selection in the reduced image RI is especially intended to reduce the computation load, whereas the contrast measurement in the original OI image is responsible for the selection of actual candidates.

The tangential term may be defined as the average or the median of the values of the pixels that lie on a correctly oriented short segment. The orthogonal measurements use the same set of 1-D kernels as in the step 30 for the reduced image RI. These kernels are orthogonal oriented segments with dead zones excluding the guide-wire area. An aggressive criterion is designed as an average of rank filter outputs. The selected rank value defines an ordered family of contrast measurements. This property will bring advantages in the further step for the extraction process. In order to calculate the orthogonal measurement in the original image OI, the potential guide-wire segment is denoted STPk, corresponding to the segment TPK in the reduced image RI, and the two neighborhoods are denoted SOP1, SOP2 and correspond to the two neighborhoods OP1, OP2 in the reduced image RI. Dead zones SDZ1, SDZ2 are also defined. The numbers of points of the segment STPk and the neighborhoods SOP1, SOP2 are determined as a function of the aggressiveness desired for a further described criterion and as a function of the noise level in the image. In an example, the two neighborhoods SOP1, SOP2 are divided into lines SL11, . . . SL17 and SL21, . . . SL27 which are orthogonal to the segment STPk and the lines are aligned on the respective points of the segment STPk which is itself aligned on the direction Dk propagated from the reduced image RI.

Preferably, the contrast measurement is effected with two ranks, namely, in a first contrast measurement step 50 for a first rank, denoted rank 0, and in a second contrast measurement step 55 for a second rank, denoted rank 1, which is more permissive than the rank 0. For the evaluation of the contrast measurement in the step 50 with the first, less permissive rank, called rank 0, the method includes evaluating the tangential term, denoted Q, as the gray-level average value on the segment STPk positioned along Dk, evaluating the orthogonal term, including the selection of one minimum gray-level value per line, that is the minimum gray-level value on each line, line after line SL11, . . . SL17 of the first neighborhood SOP1, selecting the minimum gray-level value on each line, line after line SL21, . . . SL27 of the second neighborhood SOP2, and then forming the average of all selected minimum gray-level values in the two neighborhoods, yielding a first orthogonal term of gray-level value denoted Q6.The contrast measurement with the first rank 0 is thus given by the following difference:

$$Q0=Q6-Q$$

For evaluating the contrast measurement in the second step 55 with the second, more permissive rank, called rank 1, the process includes evaluating the tangential term denoted Q, as the gray-level average value on the segment STPk positioned along Dk, evaluating the orthogonal term, including the selection, on each line and in each neighborhood, of the gray-level value which is just above the minimum gray-level value determined for the processing with the rank 0, called above minimum gray-level value, forming subsequently the average of all selected above minimum gray-level values in the two neighborhoods, yielding a second orthogonal term of gray-level value denoted Q3. The contrast measurement with the second rank 1 is then given by the following difference:

$$Q1=Q3-Q$$

Referring to FIG. 1, a step 60 for the extraction in the original image OI is also performed. A predetermined threshold is used to select the points of the original image where the contrast measurement resulting from the step 50 has a predetermined level which is considered sufficient. This predetermined threshold value can be adapted to a number of points which is selected to be taken into account. Since two contrast measurements have been performed in the original image during the steps 50, 55, two original extraction images can be created by carrying out a further step 65 which is similar to the step 60. Thus, a first original extraction image, denoted OI0 and corresponding to the very strict contrast measurement Q0 with rank 0, and a second original extraction image denoted OI1 and corresponding to the more permissive contrast measurement Q1 with rank 1, are created in the steps 60 and 65, respectively. Once created, the points of these two original extraction images OI0, OI1, are back-propagated into the reduced image and stored. This takes place in a step 61 and a step 66, respectively, thus creating two reduced extraction images denoted RI0, RI1, respectively. Once selected in the steps 60 or 65, points in the respective original images OI0, OI1 produce, by way of the steps 61 or 66, extraction counterparts in the corresponding reduced images RI0, RI1.

Referring again to FIG. 1, a further step 70 for labeling is carried out. Two procedures are proposed for this labeling step 70. The first procedure is carried out in only one reduced image, for instance the reduced extraction image of rank 0 which is called RI0. The second procedure is carried out in the two reduced images constituted by the two reduced extraction images denoted RI0 and RI1 respectively.

Figure 6A:
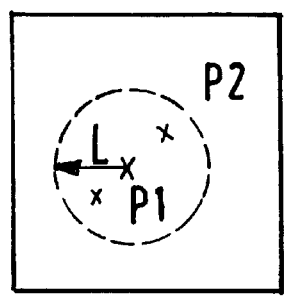
FIGS. 6A, 6B, 6C, 6D and 6E illustrate the labeling step in a method in accordance with the invention.
Figure 6B:
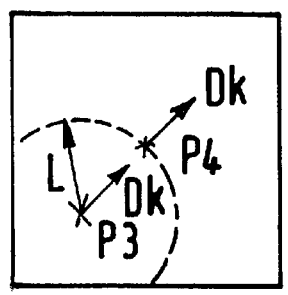
Figure 6C:
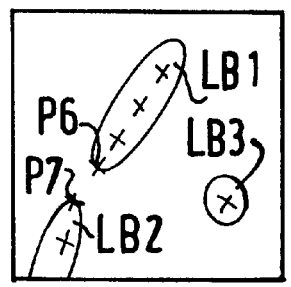

Referring to FIGS. 6A, 6B and 6C, the first procedure for labeling may comprise two passes.

Referring to FIG. 6A, the first pass comprises at least one condition which is the definition of a first labeling distance threshold denoted L, for instance 1 or 2 points. For example, the points P1, P2 may be coupled. Referring to FIG. 6B, this condition may be combined into two criteria, namely, a first criterion for labeling which includes the condition that point couples are connected only when the corresponding directions Dk associated with each point are close together, such as P3, P4, and a second criterion for labeling which is illustrated by FIG. 6C and may be combined with the first criterion and consists in choosing elongated ellipses to define the distance for connecting couples, the ellipses being oriented according to the angle θk of the local guide-wire direction Dk. In this first pass, different sets of points are connected when they satisfy the predetermined conditions and criteria. They form respective regions of connected points called connected components and denoted LB, which each receiving a label such as LB1, LB2, LB4, LB5. This first pass may also include sub-steps for component suppression when the number of points inside a labeled component is less than a predetermined number, for example LB3 which has only one point. Other sub-steps for component suppression may be performed when a predetermined contrast level is not reached within some components.

The second pass includes a determination of the end points in the components, such as P6, P7 in FIG. 6C, and of a second labeling distance threshold for connecting end points subject to the aforementioned first and second criteria. For this purpose, the second labeling distance threshold is more permissive than the first one. When end points are connected, the corresponding connected components are merged.

Figure 6D:
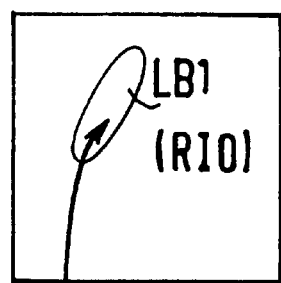
Figure 6E:
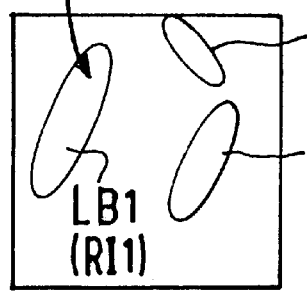

The second proposed labeling procedure is a hysteresis-based labeling operation which is carried out in the two reduced extraction images RI0, RI1 in order to perform an efficient connectivity analysis. Referring to FIGS. 6D and 6E, in the reduced extraction images RI0, RI1, the respective extracted points propagated from the two original extraction images provided by the step 60 are analyzed with respect to their connectivity. Each of the first and second reduced extraction images RI0, RI1, of rank 0 and 1, respectively, is first decomposed into connected components as described above in relation to one reduced extraction image RI0. Then a hysteresis-based operation is performed according to which in the second reduced extraction image RI1 (rank 1) only those components (such as LB1) that share points with at least one component of the first reduced extraction image RI0 (rank 0) are selected. This operation ensures both high selectivity and sensitivity. There is defined a subset of the connected components which contains the connected components which were obtained by a permissive contrast measurement and which at the same time lie over a connected component obtained with a restrictive measurement.

The points that belong to the retained connected components are eventually propagated into the original image OI (in the step 71) as finally extracted points.

Referring again to FIG. 1, a final guide-wire extraction and extrapolation is carried out in the original image in a step 80. For this purpose, around the extracted points there may be added neighboring points that belong to a centered correctly-oriented segment resulting, for example, from extrapolations. Fine line segment or oriented ellipses may be used for that purpose. This operation improves the guide-wire coverage. During the extrapolation process, it may be checked that the extrapolated points indeed belong to the guide-wire. At their locations, the gray-level values in the original image must be substantially the same as the gray-level values of the source-points. The magnitude of the discrepancy is estimated in comparison with the estimated noise standard deviation.

An advantageous application of the described process with the steps 10 to 80 lies in the noise reduction field.

Figure 7:
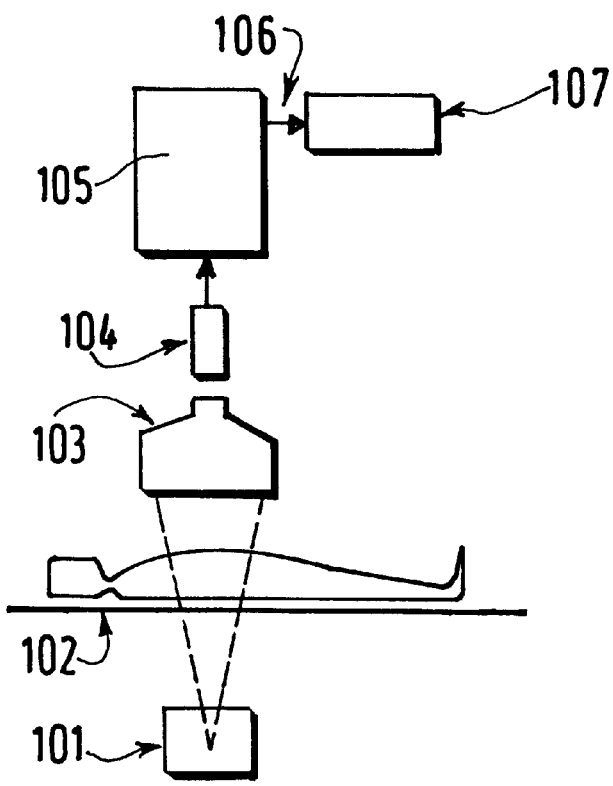
FIG. 7 illustrates an X-ray apparatus with processing means in accordance with the invention.

A medical X-ray apparatus as represented in FIG. 7 may include means for acquiring digital medical image data called original images OI, and digital processing means for processing these data so as to extract thread-like objects such as guide-wires and catheters according to the processing method described above. The X-ray apparatus includes an X-ray source 101, a table 102 for receiving the patient, and an optical system 103, 104 for providing image data to the processing means 105. The processing means may be a processor having digital calculation means for processing the data and storing means, such as memories, for storing the data. The processing means may also have at least one output 106 coupled to display means including a screen 107 for displaying the medical original images and the processed medical images such that the displayed processed images may be of assistance to the practitioner during a medical intervention.

What is claimed is:

1. An image processing method for extracting a thread-like structure represented on the background in a noisy digital image, called an original image, comprising:
   acquiring data relating to the original image;
   reducing the original image data using a transformation operation to thereby form a reduced image;
   selecting the most probable locations of guide-wire points in the reduced image by selecting at each point in the reduced image, the direction of the guide-wire which most closely matches one of several predetermined regularly oriented directions and probing the contrast around each point and along the selected directions and then,
   probing the contrast around selected locations in the original image which correspond to the selected locations determined in the reduced image,
   extracting the points which satisfy a contrast condition in the original image,
   connecting the points which also satisfy a connectivity criterion in the reduced image, and
   extracting the connected points as guide-wire points of the original image.

2. An image processing method as claimed in claim 1, wherein the reduction transform operation includes a morphological erosion with a flat kernel followed by a corresponding sub-sampling operation.

3. An image processing method as claimed in one of the claims 1 or 2, wherein the selection of the most probable direction of the guide-wire at each point of the reduced image includes defining a predetermined number of regularly oriented directions, and selecting a tangential direction according to a criterion which selects a point as a possible guide-wire point whenever the average gray level value on an oriented kernel in one of the directions crossing the point is minimum with respect to the other directions.

4. An image processing method as claimed in claim 3, wherein the contrast measurement is performed at each point of the reduced image by evaluating a difference between a local average in the tangential direction along the selected directions and local averages in the perpendicular direction with respect to the selected direction.

5. An image processing method as claimed in claim 4, wherein the point selection in the reduced image is performed by selecting a predetermined number of candidate points satisfying a criterion of maximum contrast measurement in the selected direction.

6. An image processing method as claimed in claim 5, further comprising back-propagating the selected points in the reduced image into the original image together with their selected orientations, and the step of probing the contrast around the selected locations in the original image comprises performing contrast measurements in the original image by evaluating a difference between a local average in the-tangential direction and local averages in the perpendicular direction with respect to the selected direction.

7. An image processing method as claimed in claim 6, wherein the local average in the perpendicular direction is performed with a first ranking taking into account a number of points in neighborhoods in the perpendicular directions which have minimum gray-level values, and wherein the local average in the perpendicular direction is, further performed with a second rank with more permissive conditions, taking into account points in the neighborhoods in the perpendicular direction which have gray-level values just above the minimum gray-level values evaluated for the first rank.

8. An image processing method as claimed in claim 6, wherein the point extraction in the original image is performed by selecting the points of the original image which satisfy a criterion of maximum contrast measurement either with rank 0 and rank 1 or with rank 0, and wherein the selected points are back-propagated into the reduced image, thus creating a first reduced extracting image of rank 0, and occasionally a second reduced extracting image of rank 1.

9. An image processing method as claimed in claim 8, wherein the points of each reduced extracting image are submitted to a connectivity criterion for forming connected components which each receive a label, wherein either the labeled components are selected in the reduced extraction image of rank 0 or the labeled components are selected from among those components of the first and the second reduced extracting image which lay one upon the other, and wherein the selected labeled components are back-propagated into the original image and ultimately extracted.

10. An X-ray apparatus having means for acquiring medical digital image data and digital processing means having access to said medical digital image data in order to carry out a processing method as claimed in claim 1, and having display means, including a screen, for displaying the medical digital images and the processed medical digital images.

11. An image processing method as claimed in claim 1, wherein the step of reducing the original image data comprises partitioning the original image data into non-overlapping contiguous blocks of points and representing each block of points of the original image data by a single point in the reduced image.

12. An image processing method as claimed in claim 11, wherein the step of reducing the original image data further comprises determining the point with the minimum intensity in each block of points of the original image data and assigning an intensity to each point in the reduced image as the minimum intensity of the determined point in the block of points corresponding to the point in the reduced image.

13. An image processing method as claimed in claim 1, wherein the reduction transformation operation provides a non-linear reduction of the original image data.

14. An image processing method as claimed in claim 1, further comprising the step of propagating the selected locations of points in the reduced image to the original image prior to probing the contrast around the selected locations in the original image.

15. An image processing method as claimed in claim 1, further comprising the step of propagating the selected locations of points in the reduced image to the original image along with the selected direction prior to probing the contrast around the selected locations in the original image.

16. An image processing method as claimed in claim 1, wherein the step of probing the contrast around the selected locations in the original image comprises performing contrast measurements in the original image by evaluating a difference between a local average in the tangential direction and local averages in the perpendicular direction with respect to the selected direction.

17. An image processing method as claimed in claim 7, wherein the point extraction in the original image is performed by selecting the points of the original image which satisfy a criterion of maximum contrast measurement either with rank 0 and rank 1 or with rank 0, and wherein the selected points are back-propagated into the reduced image, thus creating a first reduced extracting image of rank 0, and occasionally a second reduced extracting image of rank 1.

* * * * *